(12) United States Patent
Shibuya

(10) Patent No.: US 9,606,677 B2
(45) Date of Patent: Mar. 28, 2017

(54) DISPLAY DEVICE WITH A BACKLIGHT, CONTROL METHOD OF CONTROLLING A BACKLIGHT OF A DISPLAY DEVICE AND PROGRAM OF SAME

(75) Inventor: Atsushi Shibuya, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 188 days.

(21) Appl. No.: 13/976,051

(22) PCT Filed: Dec. 8, 2011

(86) PCT No.: PCT/JP2011/006865
§ 371 (c)(1),
(2), (4) Date: Jun. 26, 2013

(87) PCT Pub. No.: WO2012/090399
PCT Pub. Date: Jul. 5, 2012

(65) Prior Publication Data
US 2013/0271413 A1    Oct. 17, 2013

(30) Foreign Application Priority Data
Dec. 27, 2010   (JP) ................................ 2010-289304

(51) Int. Cl.
*G09G 3/36* (2006.01)
*G06F 3/044* (2006.01)
(Continued)

(52) U.S. Cl.
CPC ............ *G06F 3/044* (2013.01); *G06F 1/3215* (2013.01); *G06F 1/3218* (2013.01);
(Continued)

(58) Field of Classification Search
CPC ......... G09G 3/3406; G09G 2320/0626; G09G 2320/064; G09G 2320/0646
(Continued)

(56) References Cited

U.S. PATENT DOCUMENTS 8,184,107 B2   5/2012   Lee et al.
8,599,148 B2   12/2013  Chung et al.
(Continued)

FOREIGN PATENT DOCUMENTS

CN    101510133    8/2009
CN    101557430    10/2009
(Continued)

OTHER PUBLICATIONS

International Search Report PCT/JP2011/006865 dated Mar. 13, 2012, with English translation.
(Continued)

*Primary Examiner* — Ram Mistry
(74) *Attorney, Agent, or Firm* — Young & Thompson

(57) ABSTRACT

An object of the present invention is to achieve additional control of power consumption in a display device by performing fine-point switch off control corresponding to a method of a user's touch operation. The display device includes a touch panel and a display unit with a backlight, an area detecting section for detecting a touch area when a touch operation is performed on the touch panel, and a control section for controlling a lighting time interval of the backlight according to the touch area. The method of the touch operation by the user is detected as a difference in touch area and, according to the touch area the lighting time interval of the backlight can be controlled. For example, the lighting time interval can be set short in the case of a light touch, and the lighting time interval can be set long in the case of a firm touch.

9 Claims, 11 Drawing Sheets

(51) Int. Cl.
*G06F 1/32* (2006.01)
*G09G 3/34* (2006.01)

(52) U.S. Cl.
CPC ......... *G06F 1/3265* (2013.01); *G09G 3/3406* (2013.01); *Y02B 60/1242* (2013.01)

(58) Field of Classification Search
USPC .................. 345/102; 349/61–70; 362/561
See application file for complete search history.

(56) References Cited

U.S. PATENT DOCUMENTS

| | | |
|---|---|---|
| 2005/0192063 A1* | 9/2005 | Brubacher-Cressman et al. ............................ 455/574 |
| 2006/0284858 A1* | 12/2006 | Rekimoto ............... G06F 3/033 345/173 |
| 2007/0075965 A1* | 4/2007 | Huppi et al. ................... 345/156 |
| 2007/0182703 A1 | 8/2007 | Brubacher-Cressman et al. |
| 2009/0069056 A1* | 3/2009 | Lee et al. ...................... 455/566 |
| 2009/0256814 A1 | 10/2009 | Chung et al. |
| 2009/0267917 A1 | 10/2009 | Lee et al. |

FOREIGN PATENT DOCUMENTS

| | | | |
|---|---|---|---|
| JP | 03-095811 | | 4/1991 |
| JP | 09-134243 | | 5/1997 |
| JP | 2001-125614 | | 5/2001 |
| JP | 2002-111837 | | 4/2002 |
| JP | 200211837 | * | 4/2002 |
| JP | 2003-298732 | | 10/2003 |
| JP | 2007-235321 | | 9/2007 |
| JP | 2010-267185 | | 11/2010 |

OTHER PUBLICATIONS

Chinese Office Action, dated Jun. 1, 2015, in corresponding Chinese Patent Application No. 201180063017.6.
JP Office Action, dated Aug. 20, 2015; Application No. 2012-550693.

* cited by examiner (a)

| | | TOUCH TIME | |
| --- | --- | --- | --- |
| | | SHORT | LONG |
| TOUCH AREA | SMALL | ILLUMINATION TIME: 5 SECONDS | ILLUMINATION TIME: 30 SECONDS |
| | LARGE | ILLUMINATION TIME: 0 SECONDS | ILLUMINATION TIME: ∞ |

DISPLAY DEVICE WITH A BACKLIGHT, CONTROL METHOD OF CONTROLLING A BACKLIGHT OF A DISPLAY DEVICE AND PROGRAM OF SAME

CROSS REFERENCE TO RELATED APPLICATIONS

This is a national stage of International Application No. PCT/JP2011/006865 filed Dec. 8, 2011, claiming priority based on Japanese Patent Application No. 2010-289304 filed Dec. 27, 2010, the entire contents of which are incorporated herein by reference.

TECHNICAL FIELD

The present invention relates to a display device, control method of a display device and program and, in detail, to a display device provided with a backlight and a control method of the display device and a program.

BACKGROUND ART

So-called flat display devices, typically liquid-crystal displays and including organic EL displays and plasma displays, have been significantly widespread. Among other things, in small-sized portable electronic devices, liquid-crystal displays are used for most of display devices. One reason for adopting a flat display device is its light weight, compared with, for example, a plasma display with discharge gas contained in heavy glass.

However, the liquid-crystal display is of a transmission type not emitting light by itself, unlike a plasma display of a self-light-emission type. Therefore, in consideration of use in a bright location such as outdoor use during the daytime, a light source (a surface light source provided on a rear surface of the display: a so-called backlight) is required. However, the presence of the backlight causes an inconvenience, particularly in a portable electronic device, because power consumption by the backlight degrades the battery life.

By contrast, the organic EL display is of a self-light-emission type, and therefore does not require a backlight and, what is more, is light in weight. Therefore, the organic EL display is expected as a replacement for the liquid-crystal display. However, complete replacement has not yet been done, because organic molecules for use as a light-emitting material are disadvantageously vulnerable to oxygen and moisture and have a short life.

Therefore, superiority of the liquid-crystal display remains the same for the time being, and thus a solution to the problem described above will address social demands.

A patent document 1 mentioned below discloses a technology capable of reducing power consumption of a backlight (hereinafter, a conventional technology). In this technology, a touch sensor is provided on each of both side surfaces of the casing of a portable electronic device, and switch off control is performed on the backlight in response to a signal from each of the touch sensors. Here, "both side surfaces of the casing" means surfaces to be touched by a fingertip or others when the casing is held by hand. Therefore, according to this conventional technology, power control can be made in a manner such that the backlight is lit up when the casing is held by hand and the backlight is switched off when the hand is lifted. With this, unnecessary lighting of the backlight can be prevented to reduce power consumption of the backlight.

PRIOR ART DOCUMENT

Patent Document

Patent Document 1: JP 2007235321

SUMMARY OF INVENTION

Problem to be Solved by the Invention

In short, in the conventional technology, the backlight is lit up when the touch sensors are touched, and the backlight is switched off when the touch sensors are not touched. According to this, the backlight can be switched off while the touch sensors are not touched, thereby suppressing power consumption during that time.

However, "when the touch sensors are touched" is not restricted to the time when the user operates the portable electronic device, and includes the time when the user simply carries the portable electronic device. Therefore, because backlight also switches on while the device is simply carried (wasteful lighting), conventional technology is insufficient for further suppression of power consumption.

Thus, an object of the present invention is to suppress power consumption and, in particular, to achieve further suppression of power consumption by performing fine-point switch off control according to the way of a touch operation by a user.

Means for Solving the Problem

The present invention provides a display device including a touch panel, a display unit with a backlight, area detecting means for detecting a touch area when a touch operation is performed on the touch panel, and control means for controlling a lighting time interval of the backlight according to the touch area.

Effect of the Invention

According to the present invention, the way of the touch operation by the user is detected as a difference in touch area and, according to the touch area, the lighting time interval of the backlight can be controlled. For example, the lighting time interval can be set short in the case of a light touch, and the lighting time interval can be set long in the case of a firm touch. Therefore, fine-point switch off control can be performed according to the way of the touch operation by the user. Among other things, shorter lighting time interval can be set, and therefore further suppression of power consumption can be achieved.

BRIEF DESCRIPTION OF DRAWINGS

FIG. 11 is a diagram showing four control modes.

DESCRIPTION OF EMBODIMENTS

Embodiments of the present invention are described below with reference to the drawings. Note that it is obvious that various detailed specific or actual examples and examples of numerical values, character strings, and other signs in the description below are merely for reference in order to clarify the idea of the present invention and the idea of the present invention is not restricted by all or part of these examples. Also, known schemes, known procedures, known architectures, known circuit structures, and others (hereinafter, "known matters") are not described in detail for the purpose of simplifying the description, and this is not meant to intentionally exclude all or part of these known matters. Since these known matters can be known by persons skilled in the art at the time of filing an application of the present invention, they are naturally included in the description below.

Figure 1:
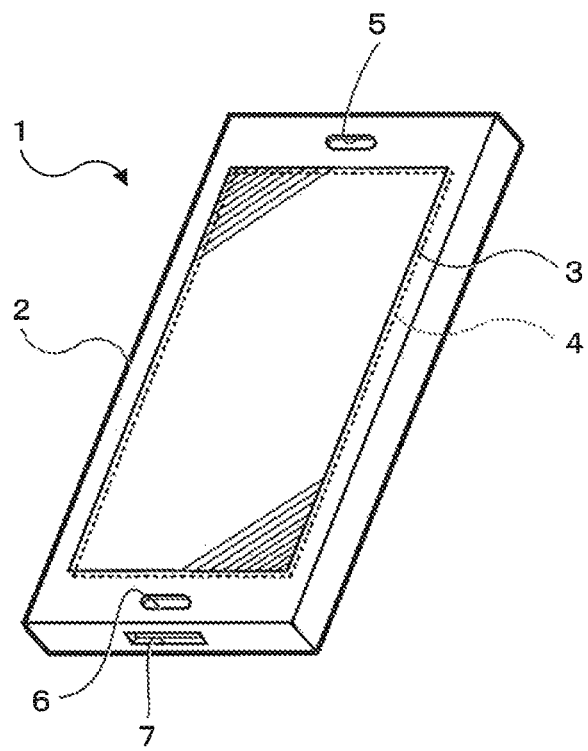
FIG. 1 shows outline views of an electronic device related to the embodiment.
Figure 1:
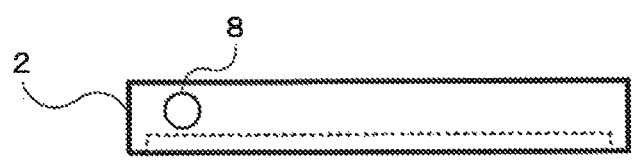
Figure 1:
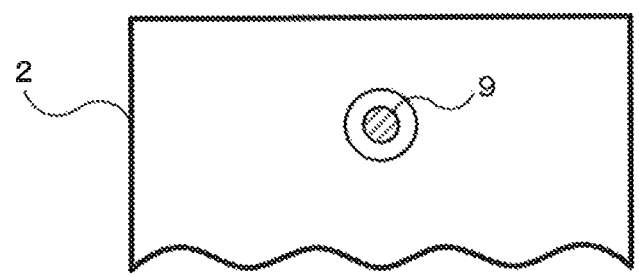

FIG. 1 shows outline views of an electronic device related to the embodiment. In these drawings, an electronic device 1 has a casing 2 in a portable shape (for example, a tablet shape). The casing 2 has a main surface as an operation surface provided with a display unit 4 where a touch panel 3 is mounted, a receiver hole 5, and a transmitter hole 6, and has a bottom surface on a main surface lower end side provided with a connector 7 for connection with an external I/F 16, which will be described further below, and for charging a power supply unit 17, which will also be described further below. Furthermore, The casing 2 has a ceiling surface on a main surface upper end side provided with a power supply button 8, and has a surface (a rear surface) opposite to the main surface provided with a taking lens 9 of an imaging unit 12, which will be described further below.

Note that while the electronic device 1 has the tablet-shaped casing 2 herein, this is not meant to be restrictive. The electronic device 1 may have a casing of another type, such as a folding type or a sliding type. An important thing is that the following two points are satisfied: the display unit 4 is a transmission flat display device (typically, a liquid-crystal display) including a backlight 13 (which will be described further below); and the touch panel 3 is of a capacitance type capable of detecting a contact with part of the human body (accurately, a projection capacitance type that supports multi-touch), and also power consumption is desired to be cut back in the electronic device 1 as much as possible (this desire is particularly high in a battery-driven device).

Figure 2:
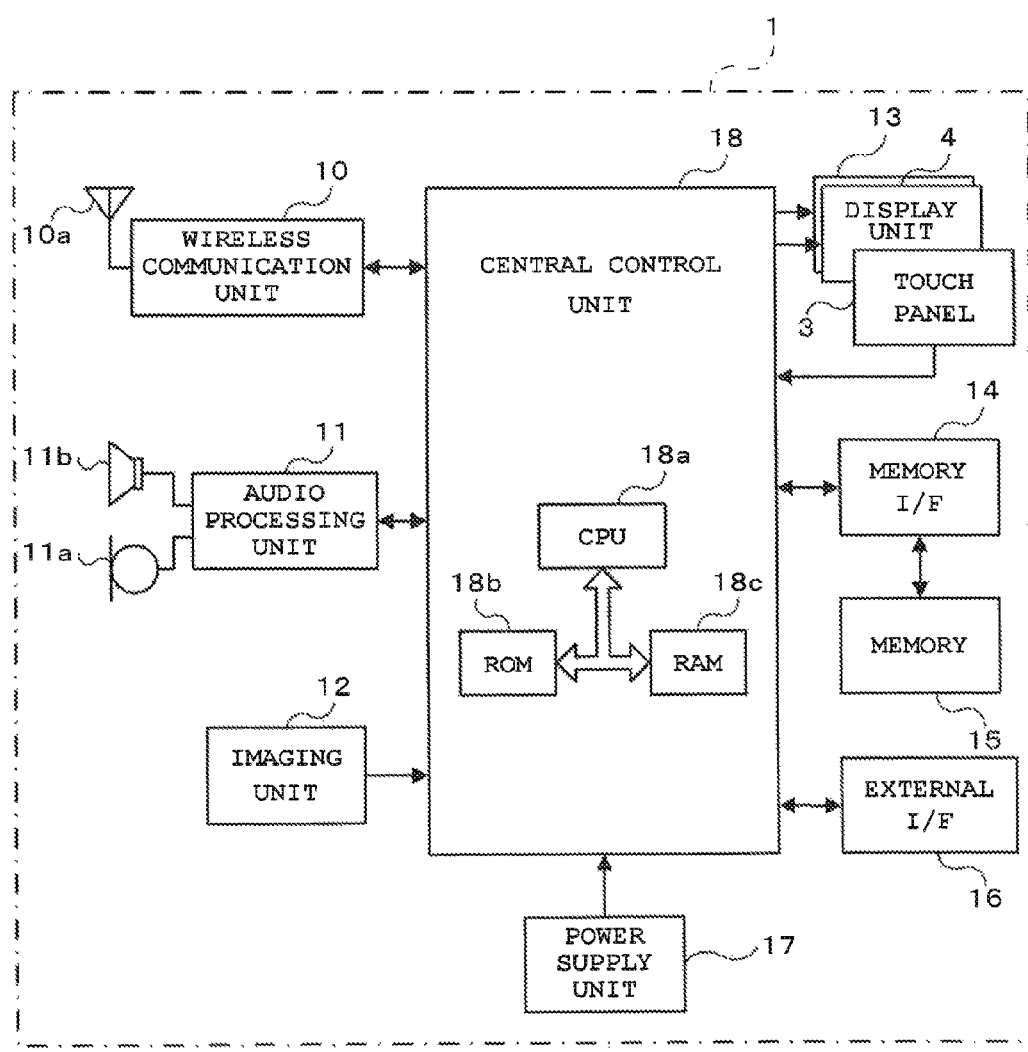
FIG. 2 is a structural diagram of the electronic device.

FIG. 2 is a structural diagram of the electronic device. The electronic device 1 includes a wireless communication unit 10, an audio processing unit 11, an imaging unit 12, the display unit 4 with a backlight 13 and the touch panel 3, a memory I/F (interface) 14, a memory 15, an external I/F 16, a power supply unit 17, a central control unit 18, and others.

The wireless communication unit 10 (here, it is assumed to be a wireless communication unit for portable telephones) transmits and receives digital data wirelessly to and from the nearest base station (not shown) via an antenna 10a. The digital data includes information about received and transmitted telephone calls and information about voice calls. This wireless communication unit 10 transmits and receives digital data according to the control from the central control unit 18.

Under the control from the central control unit 18, the audio processing unit 11 converts an audio signal captured by a microphone 11a to digital data for output to the central control unit 18. The audio processing unit 11 converts a digital audio signal outputted from the central control unit 18 to an analog signal for sound amplification from a loudspeaker 11b.

Note that while the wireless communication unit 10 is for portable telephones herein, this is not meant to be restrictive. For example, the wireless communication unit 10 may be for wireless LAN. In this case, the wireless communication unit 10 establishes a connection with a nearby wireless LAN relay device (an access point) via the antenna 10a, and accesses a resource on a network (a wired LAN or another network) connected to the access point while wirelessly transmitting and receiving digital data. Also in this case, for example, the audio processing unit 11 can be used for transmitting and receiving Internet calls, for amplifying reproduced sound from a music file downloaded from a network, or for another purpose. Furthermore, other than these examples of use purposes, the wireless communication unit 10 may be used, for example, for short distance wireless communication such as Bluetooth.

The imaging unit 21 includes the taking lens 9 depicted in FIG. 1 and a two-dimensional imaging device such as a CCD or CMOS, taking a still picture or a moving picture and outputting its image data to the central control unit 18, under the control from the central control unit 18.

As has been described above, the display unit 4 is a transmission flat display device (typically, a liquid-crystal display) requiring the backlight 13, and has its front surface provided with the projection capacitance-type touch panel 3 capable of detecting a contact of part of the human body. Here, "provided" has two meanings. Firstly, the touch panel 3 is "firmly fixed" to the front surface of the display unit 4. Secondly, the touch panel 3 is set so as simply not to be moved (not to be shifted in a surface direction) "without being bonded". In practice, any of these meanings may be applied. Also, while the touch panel 3 is usually a single independent component, this is not meant to be restrictive, and the touch panel 3 may be an integral type incorporated in the display unit 4 (generally, a touch panel layer is interposed between a cover glass and a display layer).

The memory I/F 13 is, for example, a general-purpose interface supporting the standards of the memory 15 (such as an SD card), and is positioned between the central control unit 18 and the memory 15 to mediate mutual data exchanges.

The memory 15 is a rewritable non-volatile information storage element, and a flash memory such as an SD card, a hard disk, or the like can be used. This memory 15 stores and retains various user data (such as an electronic phone book, image data obtained by the imaging unit 12, and music data downloaded from the Internet), and also stores and retains various system values (refer to FIG. 3) such as "first area", "second area", "first time", and "second time", which will be described further below.

The external I/F 16 is a data interface with an external device such as a personal computer. The external device can access the memory 15 via this external I/F 16 and the central control unit 18. The external I/F 16 is used to retrieve user data such as an electronic phone book or downloaded data stored in the memory 15 to the external device or write the user data back to the memory 15 from the external device.

The power supply unit 17 includes a battery formed of a primary battery or a chargeable secondary battery. From the power of this battery, the power supply unit 17 generates various power supply voltages required for the operation of the electronic device 1 and supplies the voltages to respective units.

The central control unit 18 is a program-controlled control element including a computer or a microcomputer (hereinafter, CPU) 18a, a read-only semiconductor memory (hereinafter, ROM) 18b, a high-speed semiconductor memory (hereinafter, RAM) 18c, and a peripheral circuit not shown. With a control program stored in advance in the ROM 18b being loaded to the RAM 18c and executed by the CPU 18a, the central control unit 18 sequentially performs various processes and controls the entire operation of this electronic device 1 in a centralized manner. Note that the ROM 18b may be a rewritable non-volatile semiconductor memory (such as a flash memory or PROM).

Figure 3:
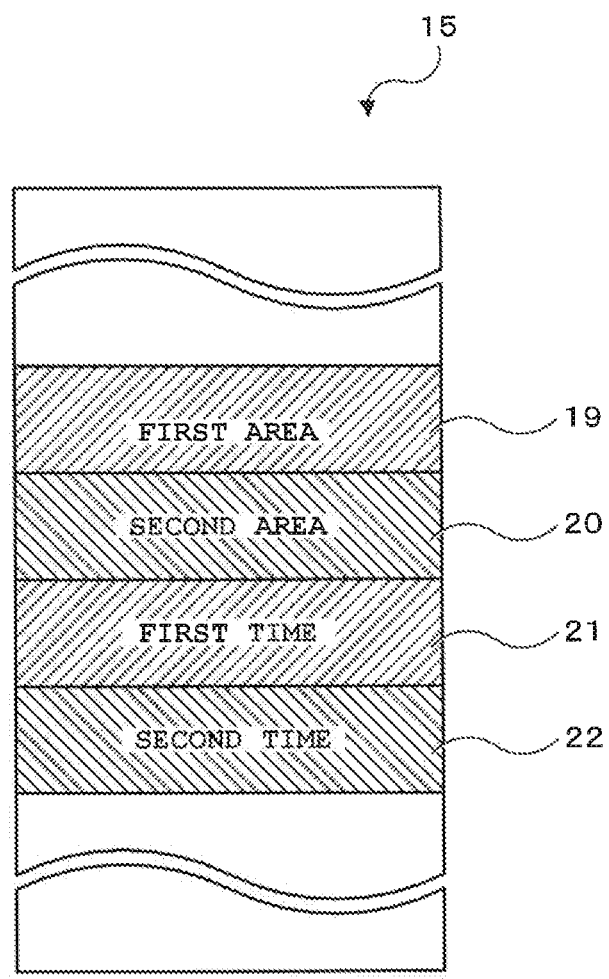
FIG. 3 is a data storage structural diagram of a memory 15.

FIG. 3 is a data storage structural diagram of the memory 15. In this drawing, as has been described above, the memory 15 stores and retains various user data (such as an electronic phone book, image data obtained by the imaging unit 12, and music data downloaded from the Internet), and also stores and retains various system values such as "first area", "second area", "first time", and "second time". The latter system values are important in the present embodiment.

In the memory 15, storage fields of these system values are separately prepared. In an example depicted in the drawing, from top of the drawing, a first area storage field 19, a second area storage field 20, a first time storage field 21, and a second time storage field 22 are allocated.

Here, "first area" is a system value provided with a unique name of "first area". Similarly, "second area", "first time", and "second time" are system values provided with unique names of "second area", "first time", and "second time", respectively. These system values may be fixed values set in advance (so-called constants) or variable values arbitrarily changeable by the user (so-called variables), an actual example of which will be described in detail further below. In the following, these system values are handled as fixed values unless otherwise mentioned.

Figure 4:
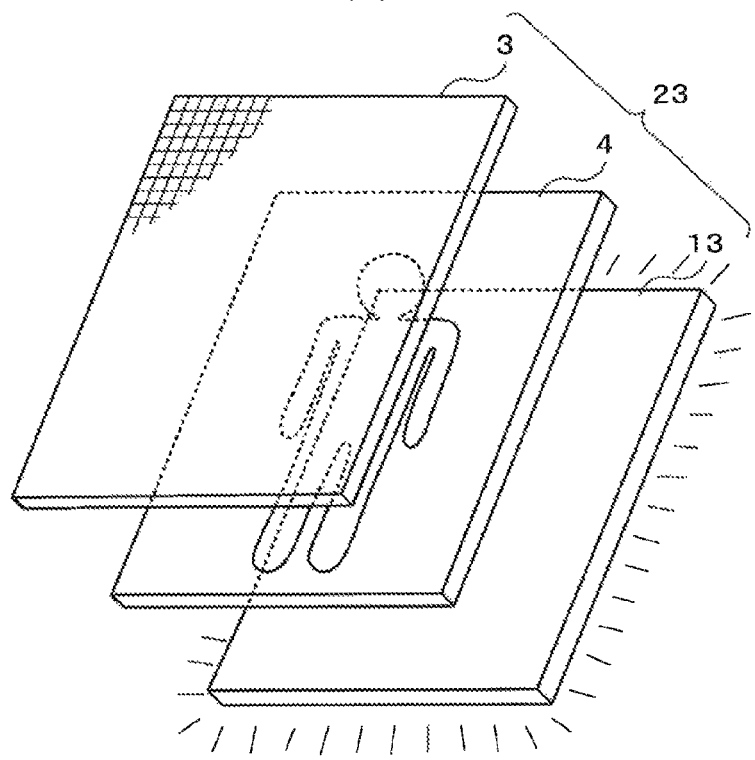
FIG. 4 is a structural drawing of a display device, and a schematic structural diagram of a touch panel 3.
Figure 4:
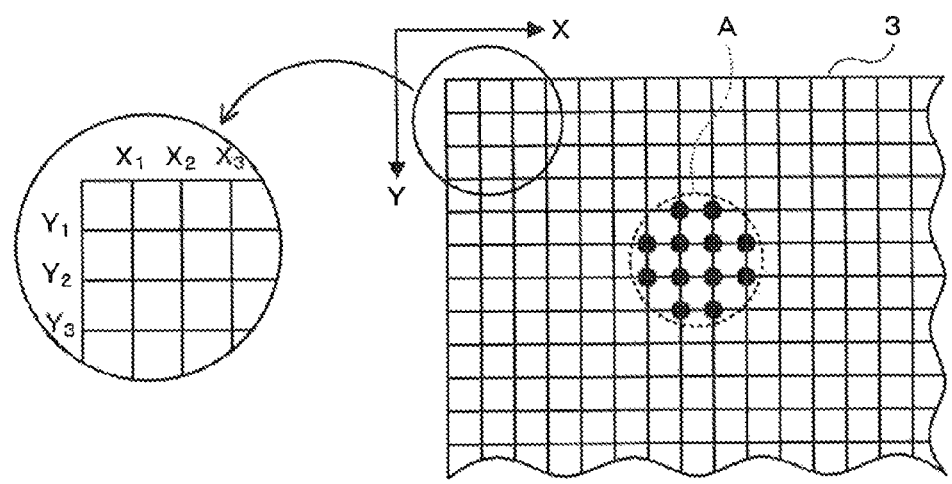

FIG. 4 (a) is a structural drawing of a display device. As depicted in the drawing, a display device 23 is configured to have the backlight 13 on a rear surface side of the display unit 4 and the touch panel 3 on a front surface side (a display surface side) of the display unit 4 so that the backlight 13, the display unit 4, and the touch panel 3 are in intimate contact without a gap. Note that while these three portions (the backlight 13, the display unit 4, and the touch panel 3) are rendered so as to be slightly shifted in a plane direction in the drawing, this is for the purpose of convenience for illustration. In practice, the three portions are integrated into one laminated body.

As has been described above, the display unit 4 is a transmission flat display device (generally, a liquid-crystal display) requiring the backlight 13. In view of this point, a flat display device of a self-light-emission type (such as an organic EL display) is not suitable as the display unit 4 of the present embodiment. This is because the self-light-emission type neither requires the backlight 13 nor has a technical problem of performing fine-point switch off control over the backlight 13. Therefore, the display unit 4 of the present embodiment is at least a flat display device other than those of the self-light-emission type, and is typically, but not restricted to, a liquid-crystal display. The display unit 4 can be any as long as it is a transmission flat display device requiring the backlight 13.

FIG. 4 (b) is a schematic structural diagram of the touch panel 3. As depicted in this drawing, the touch panel 3 has many X electrodes ($X_1$, $X_2$, $X_3$, . . . ) and Y electrodes ($Y_1$, $Y_2$, $Y_3$, . . . ) equidistantly arranged along an X axis and a Y axis, respectively. The X electrodes and the Y electrodes are band-shaped electrodes with the same width or lined small rhombic or rectangular electrodes made of a transparent conductive material (generally, ITO) (the material may be tinted to some extent as long as it has a transmittance close to transparency). Each X electrode and Y electrode face each other across a flexible transparent (as described above) dielectric material having a predetermined permittivity ($\in$). Other portions of the touch panel 3 (portions other than the electrodes) are also formed of a transparent (as described above) material.

By applying a drive signal with a predetermined frequency to one of the X electrode and the Y electrode to examine the magnitude of the drive signal appearing on the other, a capacitance between the X and Y electrodes can be measured. Based on this principle, the capacitance-type touch panel 3 detects a touch by the human body (generally, a fingertip). Since the human body is assumed as a ground body with a predetermined capacitance (on the order of 100 PF), if the human body touches the touch panel 3, the capacitance at its touched position is changed. Also, a projection capacitance-type touch panel can detect multi-touch (touch at a plurality of points). The touch panel 3 of the present embodiment is of the projection capacitance type.

Here, in FIG. 4 (b), a range A surrounded by a broken line is assumed to be a touch surface touched by a fingertip. This range A includes several detection points as indicated by black circles. Since the projection capacitance-type touch panel 3 supports multi-touch, the positions (XY coordinates) of a plurality of touch points (black circles) can be individually detected. Therefore, from the detection results, a fingertip touch area (an area of the range A) can be calculated.

By applying calculation of the touch area, the way of touch (a light touch and a firm touch) can be discriminated.

Figure 5:
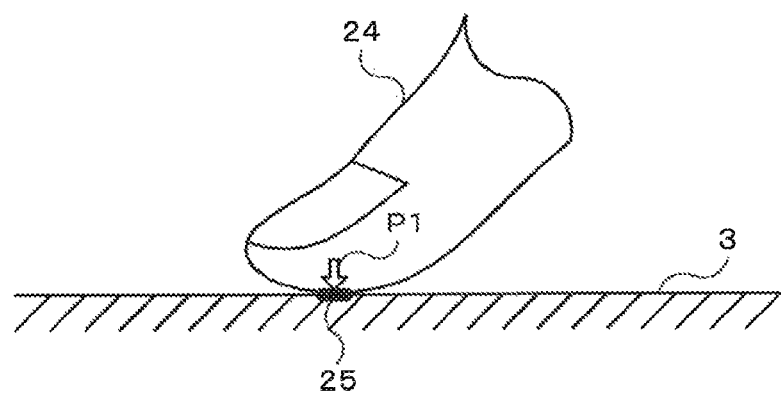
FIG. 5 shows explanatory drawings that differentiate methods of touching.
Figure 5:
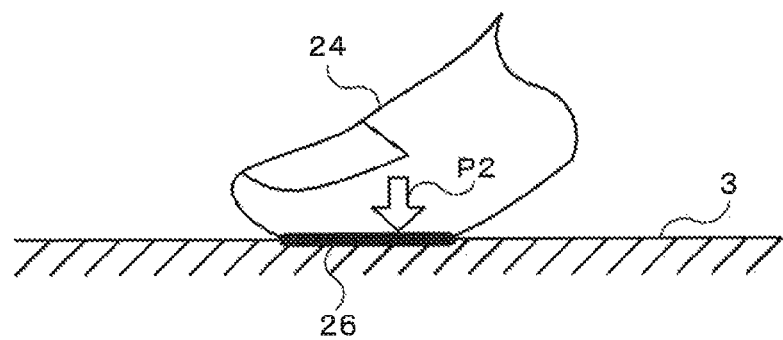
Figure 5:
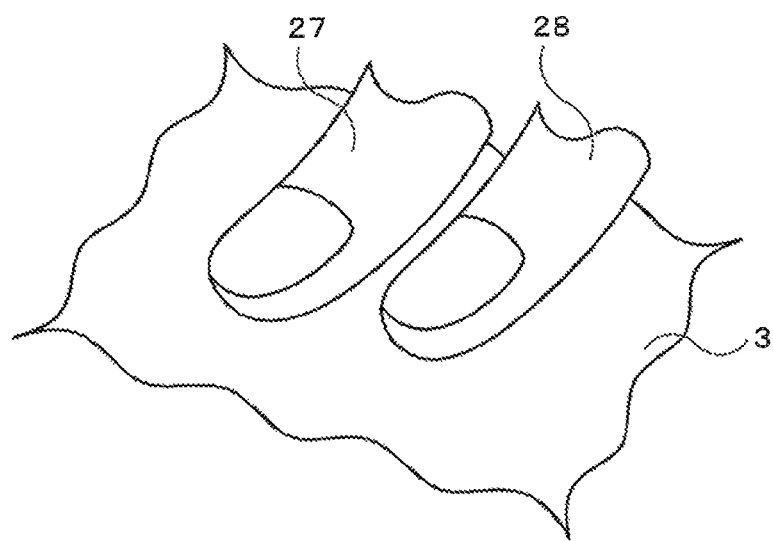

FIG. 5 shows explanatory drawings that differentiate methods of touching. In these drawings, firstly, as depicted in (a), when the touch panel 3 is lightly touched by a fingertip 24 (touched with a light force P1), only part of the skin surface of the fingertip 24 is in touch with the touch panel 3. The size of a touch surface (a touch area) at this time is indicated by a bold line 25. On the other hand, as depicted in (b), when the touch panel 3 is firmly touched by the fingertip 24 (with a strong force P2), the skin of the fingertip 24 significantly becomes flat, and a wide portion of the skin surface is in touch with the touch panel 3. The size of a touch surface (a touch area) at this time is indicated by a bold line 26. In comparison between these two bold lines 25 and 26, the latter (with application of the strong force P2) is large, as a matter of course. That is, the touch area in (a) is small, and the touch area in (b) is large.

As has been described above, the touch panel 3 of the projection capacitance type supports multi-touch, and is capable of individually detecting the positions of a plurality of touch points and calculating each touch area from the detection result. Therefore, the small touch area depicted in (a) (a light touch) and the large touch area depicted in (b) (a strong touch) can be discriminated.

While the above description has been made to a touch by one finger, a touch by a plurality of fingers can further be discriminated. FIG. 5 (c) depicts an example of a touch by two fingers, and fingers 27 and 28 depicted in the drawing are two fingers (for example, the index finger and the middle finger) of the same person. With a touch by the fingers 27 and 28 simultaneously, the size (the touch area) of a contact surface of each of the fingers 27 and 28 is calculated, and the calculated touch area is larger than the touch area with one finger 24 depicted in (a) and (b). As such, by examining the magnitude of the touch area, a touch by one finger and a touch by a plurality of fingers can be discriminated. Furthermore, according to this concept, a touch by a human body part other than a finger can be discriminated. For example, in the case of a touch by the palm, its touch area is significantly larger than not only the touch area with one finger but also the touch area with a plurality of fingers (even if the touch area is with all five fingers of one hand). Therefore, a touch by a human body part (such as the palm) other than a finger can be discriminated on a similar principle.

Figure 6:
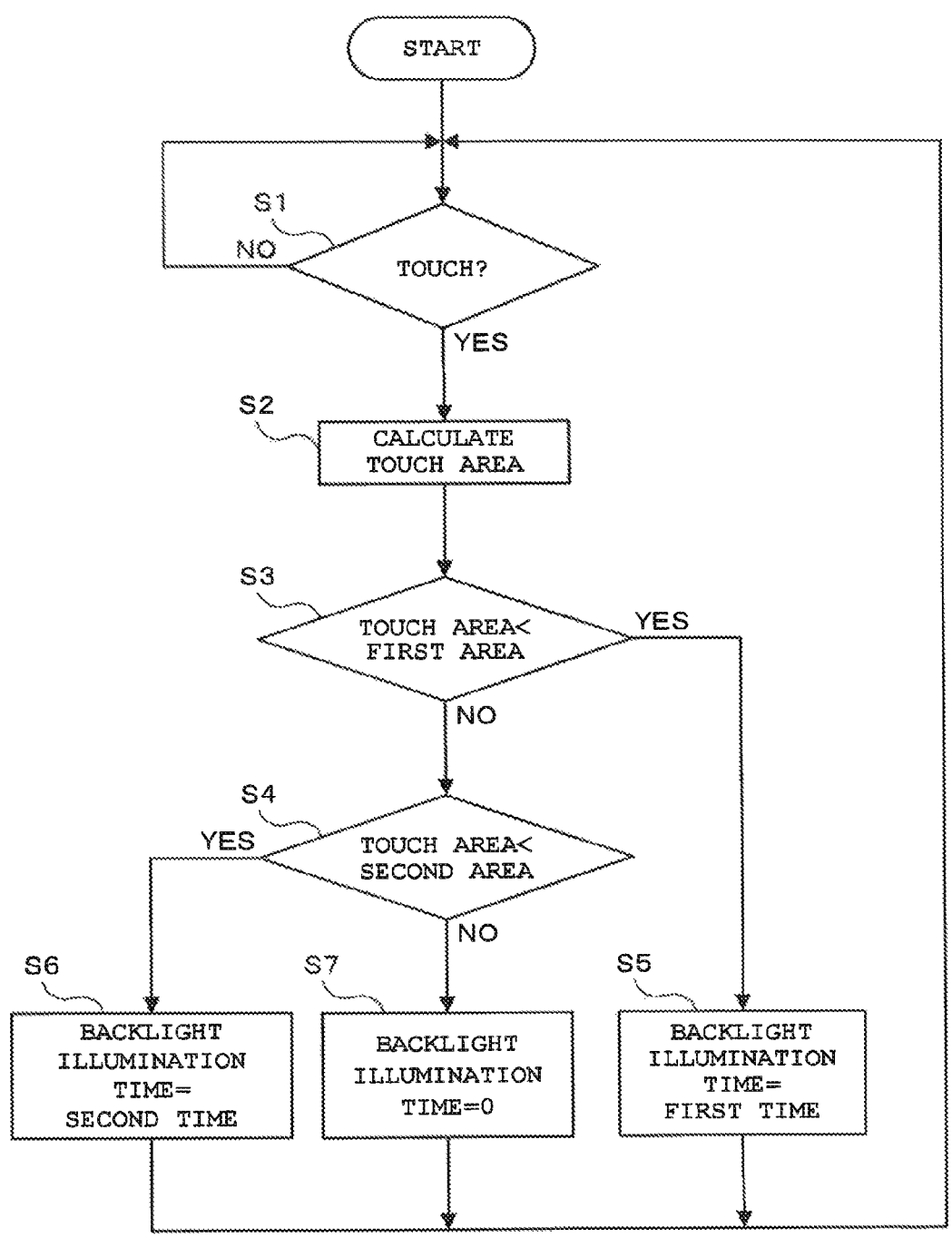
FIG. 6 is a diagram of a main flow of a control program to be executed in a central control unit 18.

FIG. 6 is a diagram of a main flow of a control program to be executed in the central control unit 18. In this control program, the presence or absence of a touch operation on the touch panel 3 is first determined (Step S1). When a touch operation is absent, the procedure loops at Step S1. On the other hand, when a touch operation is present, a touch area is next calculated (Step S2).

When a touch area is calculated, it is next determined whether the touch area is smaller than a system value (the first area) read from the first area storage field 19 of the memory 15 (Step S3). If it is not smaller than the first area, it is determined whether the touch area is smaller than a system value (the second area) read from the second area storage field 20 of the memory 15 in a similar manner (Step S4). Then, according to the determination results (the determination results at Step S3 and Step S4), the illumination time (lighting duration time: the backlight is switched off after a lapse of this duration time) of the backlight 13 is set to any of the following three modes.

First mode: illumination time of the backlight 13=first time (Step S5)

Second mode: illumination time of the backlight 13=second time (Step S6)

Third mode: illumination time of the backlight 13=0 (Step S7)

Figure 7:
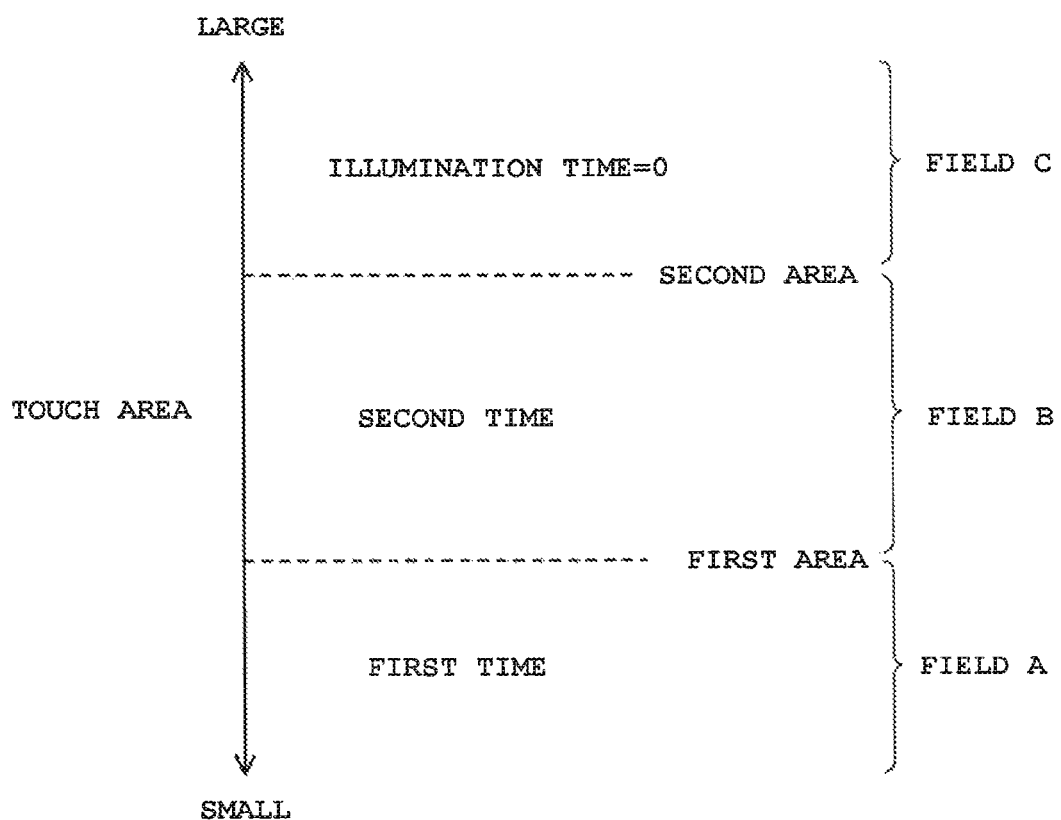
FIG. 7 is a diagram depicting a relation between a first area and a second area.

FIG. 7 is a diagram depicting a relation between the first area and the second area. In this drawing, the vertical axis represents the touch area, indicating larger areas as going upward and smaller areas as going downward. As depicted in the drawing, the first area is positioned in a downward direction of the vertical axis, and the second area is positioned in an upward direction of the vertical axis. Therefore, the first area and the second area have a relation of "first area"<"second area".

For convenience of description, it is assumed that a field A is smaller than the first area, a field B is between the first area and the second area, and a field C is larger than the second area. With determination algorithms at Step S3 and Step S4 of FIG. 6, the first mode is applied to the field A, the second mode is applied to the field B, and the third mode is applied to the field C. Therefore, in the end, the field A is set at "first time", the field B is set at "second time", and the field C is set at "illumination time=0". Here, "first time" indicates a system value read from the first time storage field 21 of the memory 15, and "second time" indicates a system value read from the second time storage field 22 of the memory 15.

Meanwhile, "illumination time=0" (the field C) means that the backlight 13 is immediately turned OFF (switched off). Therefore, according to the control program of FIG. 6, an operation can be obtained such that the backlight 13 can be immediately switched off when a touch operation is performed on an area (a touch area) larger than the second area. Thus, a unique effect can be achieved such that wasteful power consumption can be suppressed (hereinafter, a first effect).

The type of a touch operation on a large area (touch area) depends solely on the value of "second area". For example, if "second area" is set at a value corresponding to the palm, the backlight 13 can be immediately switched off with a touch by the palm. Alternatively, "second area" may be set at a value corresponding to four fingers and five fingers, or may be set at a value corresponding to part of the palm (for example, a plump portion near the wrist such as thenar or hypothenar). With any of a touch by four fingers or five fingers and a touch with part of the palm, the backlight 13 can be immediately switched off (the first effect can be obtained).

A point of the first effect is that the backlight 13 can be immediately switched off in response to a "specific touch operation" performed by the user. Therefore, the type of the touch operation is not restricted to the examples described above (such as the palm, part of the palm, and four fingers or five fingers). In practice, an appropriate type of the touch operation is selected in consideration of the following two points: the backlight 13 can be switched off intuitively: and a clear discrimination from a normal touch operation can be made. That is, a value corresponding to the selection result is set to "second area" described above. For example, when a touch operation with the palm is selected for "specific touch operation", a value corresponding to the area of the palm is set to "second area" described above.

Also, according to the control program of FIG. 6, an operation can be obtained such that the illumination time of the backlight 13 is set at the second time when a touch operation with an intermediate area (touch area) smaller than the second area and larger than the first area is performed and the illumination time of the backlight 13 is set at the first time when a touch operation with a small area (touch area) smaller than the first area.

The touch operation of a small area, for example, is a touch operation (a light touch operation) in FIG. 5 (a). The touch operation of an intermediate area, for example, is a touch operation in FIG. 5 (b) (a firm touch operation) and a touch operation in FIG. 5 (c) (a touch operation with two fingers).

Any of these touch operations, that is, the light touch operation, the firm touch operation, or the touch operation with two fingers is included in a range of normal touch operations. This is because the user performs a light touch operation or a firm touch operation when selecting an icon displayed on the display unit 4 and scrolling the screen and performs a touch operation with two fingers when zooming in/out graphics, characters, and others displayed on the display unit 4.

Any of these normal touch operations is a generally known operation scheme, which is nowadays called a tap (corresponding to an operation of lightly tapping with a finger/a click with a mouse), a double tap (corresponding to an operation of tapping twice/double click), a drag (an operation of shifting the finger when a photograph or the like is moved), a flick (an operation of lightly whisking with a finger when scrolling a list or the like), a pinch (an operation of pinching with two fingers), a pinch-out or a pinch-open (an operation of enlargement a space between two fingers for magnification), a pinch-in or a pitch close (an operation of narrowing a space between two fingers for reduction), or the like.

It is now assumed that the relation in magnitude between the first time and the second time is such that "first time"<"second time" and, furthermore, for convenience of description, "first time" is set at five seconds and "second time" is set at thirty seconds. In this case, according to the control program of FIG. 6, the backlight 13 can be switched off after a lapse of five seconds (after a lapse of the first time) when a "light" touch operation is performed, and the backlight 13 can be switched off after a lapse of thirty seconds (after a lapse of the second time) when a "firm" touch operation is performed. Therefore, a unique effect can be achieved such that fine-point switch off control according to the touch operation by the user can be performed (hereinafter, a second effect).

This fine-point switch off control follows user's general operation tendencies. A first operation tendency is that when a "light" touch operation is performed, most users do not intend to perform the operation at great length and merely intend to have a glimpse of displayed information (for example, check an incoming mail), for example. Also, a second operation tendency is that when a "firm" touch operation or a touch operation with two fingers is performed, most users view displayed information in detail and the possibility of continuing the operation onward is high. In the latter case (the second operation tendency), the illumination time of the backlight 13 should be set at a long time (the second time) in accordance with the operation time. By contrast, in the former case (the first operation tendency), the illumination time of the backlight 13 should be set at a time as short as possible (the first time) in order to avoid wasteful lighting and reduce power consumption.

Therefore, according to the control program of FIG. 6, in addition to the first effect and the second effect described above, (1) an effect of optimizing the illumination time when the user has a tendency of operating for a long period of time (the second operation tendency described above) and the illumination time when the user has a tendency of operating only for a short period of time (the first operation tendency described above) (hereinafter, a third effect) and (2) an effect of reducing the illumination time when the user has the tendency of operating only for a short period of time (the first operation tendency described above) (setting the illumination time at the first time) to avoid wasteful illumination and suppress wasteful power consumption (hereinafter, a fourth effect).

Note that three stages (illumination time 0, the first illumination time, and the second illumination time) can be set to the illumination time of the backlight 13 in the embodiment described above, this is not meant to be restrictive. The time between the first time and the second time may be divided into two or more stages, and an appropriate illumination time may be set for each stage. In this case, however, system values (the first area and the second area) for discrimination of the touch area are also required to be additionally set in a similar manner. For example, when the time between the first time and the second time is divided into n stages, in addition to the two times, that is, the first time and the second time, n illumination times are required to be set. Also, regarding the system values (the first area and the second area) for discrimination of the touch area, in addition to the two areas, that is, the first area and the second area, n areas are required to be set.

Also, while the first area and the second area have fixed values set in advance in the above description, this is not meant to be restrictive, and they may have variable values arbitrarily changeable by the user.

Figure 8:
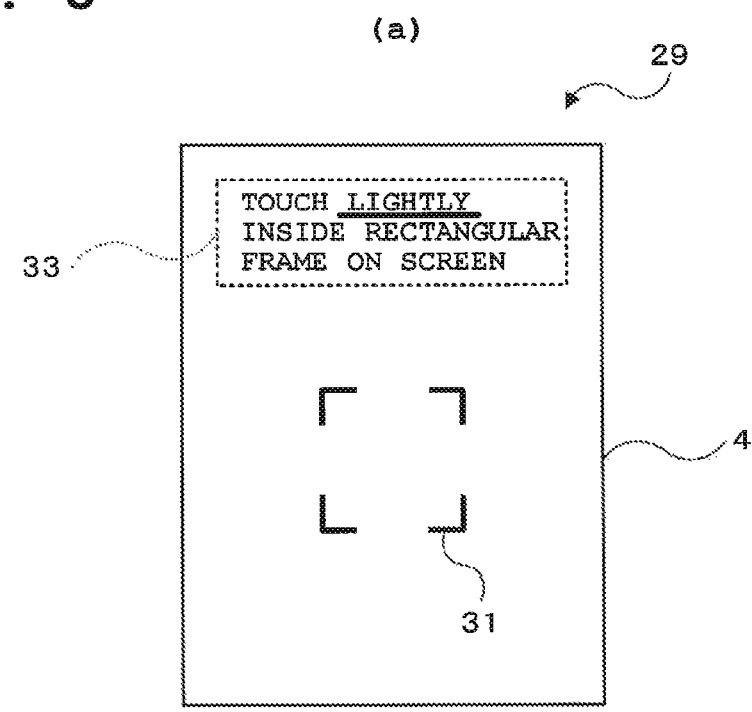
FIG. 8 shows drawings illustrating an example of a user interface when the first area and the second area have variable values.
Figure 8:
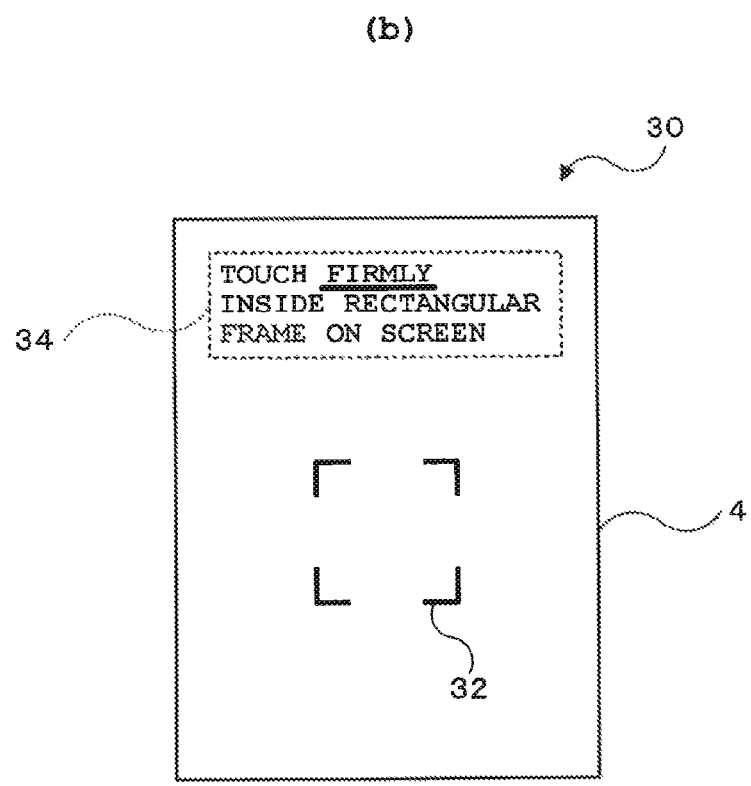

FIG. 8 shows drawings illustrating an example of a user interface when the first area and the second area have variable values. In these drawings, either one of a first area setting screen 29 depicted in (a) and a second area setting screen 30 depicted in (b) is displayed on the screen of the display unit 4. In the screens 29 and 30, touch regions 31 and 32, respectively, each in a predetermined shape (here, a rectangular shape) are provided at an approximately center of the screen, and message regions 33 and 34, respectively, are provided on an upper portion of the screen. In the message region 33 of the first area setting screen 29, a guide sentence for prompting the user to make a light touch on the touch region 31 (for example, "Touch lightly inside the rectangular frame on the screen") is displayed. Also, in the message region 34 of the second area setting screen 30, a guide sentence for prompting the user to make a firm touch on the touch region 32 (for example, "Touch firmly inside the rectangular frame on the screen") is displayed.

When the value of the first area is changed, the user opens the first area setting screen 29 depicted in (a) and lightly touches the touch region 31 on the screen. By calculating the touch area (a small touch area) of the touch region 31 and substituting the calculation result into the system value stored and retained in the first area storage field 19 of the memory 15, the value of the first area can be changed. The same goes when the value of the second area is changed. The user opens the second area setting screen 30 depicted in (b) and firmly touches the touch region 32 on the screen. By calculating the touch area (a large touch area) of the touch region 32 and substituting the calculation result into the system value stored and retained in the second area storage field 20 of the memory 15, the value of the second area can be changed.

It is preferable to be able to arbitrarily change the first area and the second area because differences in habit of each user's operation, age bracket, hardness of finger's skin, and others can be flexibly supported. This is because even with touch operations with the same strength, for example, the touch area slightly varies between the child's finger and adult's finger and the hardness of the finger's skin also slightly varies for each individual. With the use of the user interfaces depicted in FIG. 8, the first area and the second area suitable for the user can be set irrespectively of the habit, age, hardness of finger's skin.

Furthermore, similarly, the first time and the second time may have variable values arbitrary changeable by the user.

Figure 9:
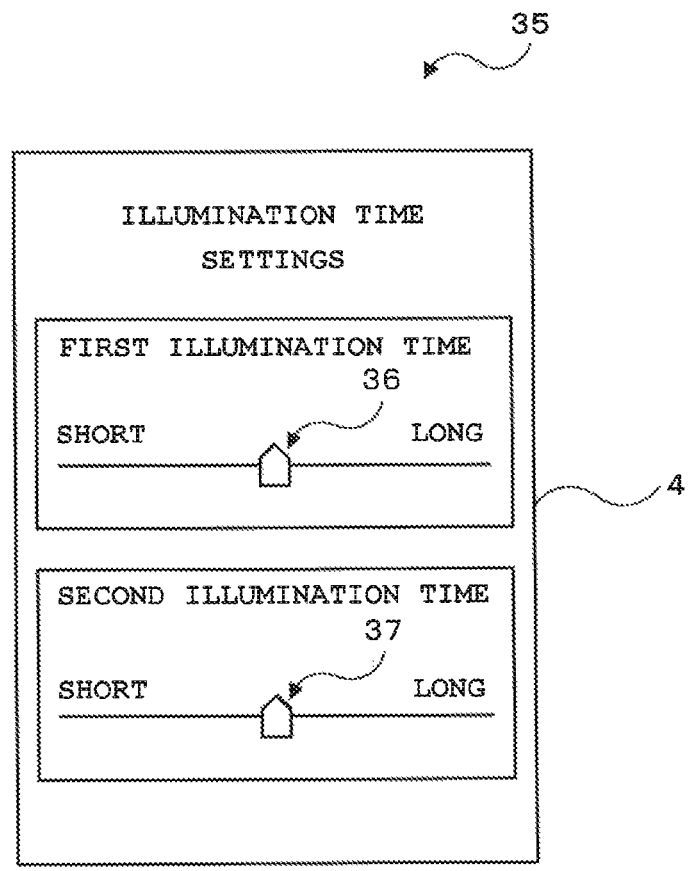
FIG. 9 is a diagram depicting an example of a user interface when a first time and a second time have variable values.

FIG. 9 is a diagram depicting an example of a user interface when the first time and the second time have variable values. In this drawing, a first and a second time setting screen 35 are displayed on the screen of the display unit 4. On this screen 35, a first time setting slide control 36 and a second time setting slide control 37 are provided. Note that a slide control is a known program component where a button capable of moving a guide groove is rendered. By moving the button, a numerical value corresponding to the position of the button can be generated in a stepless manner.

To change the value of the first time, the user moves the button of the first time setting slide control 36 in a desired direction. For example, in the example depicted in the drawing, the first time is shortened when the button is moved to left, and the first time is lengthened when the button is moved to right. Similarly, to change the value of the second time, the user moves the button of the second-time-setting slide control 37 in a desired direction.

The value of the first time can be changed by changing the system value stored and retained in the first time storage field 21 of the memory 15 according to the button position of the first-time-setting slide control 36. Also, the value of the second time can be changed by changing the system value stored and retained in the second time storage field 21 of the memory 15 according to the button position of the second-time-setting slide control 37.

As such, if the first time and the second time can be arbitrarily changed by the user, fine-point switch off control over the backlight 13 can be made suitable for user's preferences. For example, for a user who often views a screen for a long time to a degree when performing a light touch operation, the first time is set long. For a user who momentarily takes a glimpse when performing a light touch operation, the first time is set shorter. For a user who often views a screen for a longer time when performing a firm touch operation or a touch operation with two fingers, the second time is set longer. For a user who views a screen not for a long time when performing such an operation as described above, the second time is set shorter.

As described above, it is preferable to set all or part of the first area, the second area, the first time, and the second time as being changeable by the user, because touch determination and illumination time control suitable for the age bracket of the user and the operation habit of each individual user can be performed, thereby achieving high practicability.

The embodiment described above can be variously developed and improved. Examples of improvement can be as follows.

Figure 10:
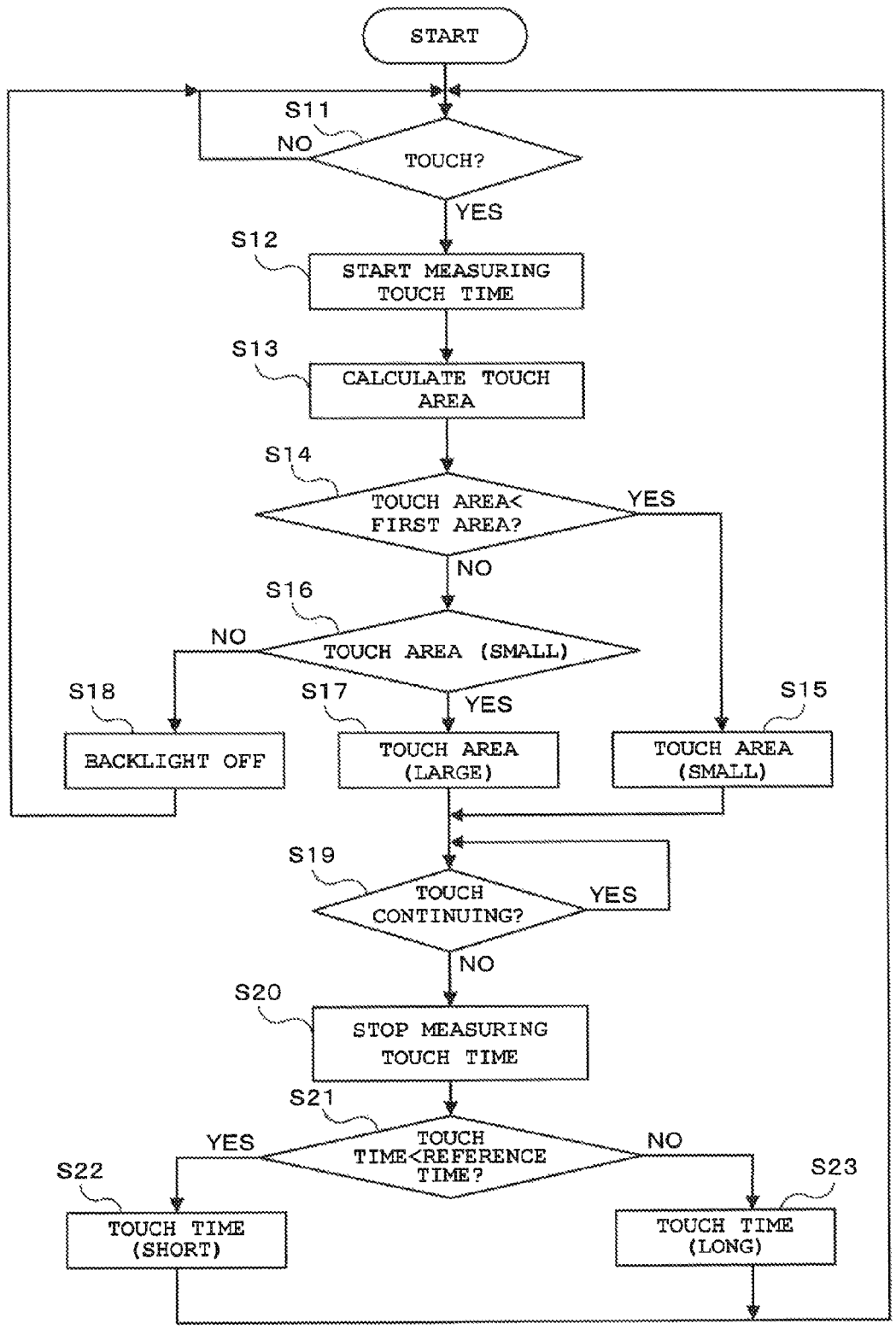
FIG. 10 is a diagram depicting an example of an improvement of the control program in FIG. 6.

FIG. 10 is a diagram depicting an example of an improvement of the control program in FIG. 6. A difference from the control program in FIG. 6 is that a determination as to whether the touch time is long or short is made, in addition to a determination as to whether the touch area is large or small. That is, in this improved control program, the presence or absence of a touch operation on the touch panel 3 is first determined (Step S11). When a touch operation is absent, the procedure loops at Step S11. On the other hand, when a touch operation is present, a measurement of a touch time is next started (Step S12), and then a touch area is calculated (Step S13).

When a touch area is calculated, it is next determined whether the touch area is smaller than a system value (the first area) read from the first area storage field 19 of the memory 15 (Step S14). If it is smaller, "touch area (small)" is determined (Step S15). If it is not smaller, it is determined whether the touch area is smaller than a system value (the second area) read from the second area storage field 20 of the memory 15 in a similar manner (Step S16). If it is smaller, "touch area (large)" is determined (Step S17). If the touch area is not smaller than the second area, the backlight 13 is immediately switched off (Step S18).

After the magnitude of the touch area is determined at Step S15 or Step S17, it is next determined whether the touch operation is continuing (Step S19). This determination loops while the touch is continuing. When the touch operation ceases (when the fingertip or others moves away from the touch panel 3), the procedure exits the loop to stop measuring the touch time (Step S20).

When measuring the touch time stops, it is next determined whether the touch time measured at Step S12 to Step S20 is smaller than a predetermined reference time (Step S21). If it is smaller, "touch time (short)" is determined (Step S22). If it is not smaller, "touch time (long)" is determined (Step S23).

As such, according to the improved control program of FIG. 10, in addition to two determination results, that is, "touch area (large)" and "touch area (small)", two determination results, that is, "touch time (long)" and "touch time (short)", can be obtained, and therefore four determination results in total can be obtained.

By combining these four determination results, $2^2=4$ types of control can be performed.

FIG. 11 is a diagram showing four control modes. In this drawing, "illumination time: 5 seconds" is set at a point of intersection of the touch area (small) and the touch time (short), and "illumination time: 0 second" is set at a point of intersection of the touch area (large) and the touch time (short). Also, "illumination time: 30 seconds" is set at a point of intersection of the touch area (small) and the touch time (long), and "illumination time: $\infty$" is set at a point of intersection of the touch area (large) and the touch time (long). Here, "illumination time: 5 seconds" corresponds to the first time described above, and "illumination time: 30 seconds" corresponds to the second time described above.

According to the improved example, four modes, which is more than the modes of the embodiment described above (refer to the fields A to C in FIG. 7; a first mode to a third mode) by one, can be performed. That is, while three modes (the first mode to the third mode), that is, "illumination time: 5 seconds", "illumination time: 0 second", and "illumination time: 30 seconds", can be taken even in the embodiment described above, in addition to these, a fourth mode, that is, "illumination time: $\infty$", can be taken according to the improved example.

The fourth mode, that is, "illumination time: $\infty$", is a characteristic mode achieved by the improved example. With this addition of the fourth mode, more user operation demands can be addressed.

The reason for the above is as follows. When the touch area is large (a firm touch operation) and the touch time is long (a special operation such as screen scrolling or zooming-in/out is performed), it can be said that the user considerably seriously faces and operates the touch panel 3. In this case, it is predicted that the operation time will last considerably long (in some cases, it will last for several hours) Therefore, with application of the fourth mode ("illumination time: $\infty$") it is possible to avoid an inconvenience that illumination of the backlight 13 is shut off involuntarily in the course of the operation for a long time. Thus, this fourth mode satisfies the need of the user. Note that while "illumination time: $\infty$" is set herein, this is not meant to be restrictive. "$\infty$" may be read as several tens of minutes or several hours. In short, any time can be set as long as it is appropriate for preventing illumination of the backlight 13 from being shut off in the course of the operation for a long time. Also, "illumination time: CO" may be arbitrarily changed and set by using a user interface as depicted in FIG. 9 described above.

DESCRIPTION OF REFERENCE NUMERALS

3 touch panel
4 display unit 13 backlight
18 central control unit (area detecting means, control means, time measuring means)
18a CPU (computer)
23 display device
29 first area setting screen (user interface)
30 second area setting screen (user interface)
35 first and second time setting screens (user interface)
36 first time setting slide control (program component)
37 second time setting slide control (program component)

The invention claimed is:

1. A display device, comprising:
a touch panel;
a display unit with a backlight;
a data storage device configured to store, as predetermined system values, a first area value, a second area value larger than the first area value, a first time, a second time longer than the first time, and a third time longer than the second time;
an area calculating section that, when a touch operation is performed at an arbitrary position on the touch panel, calculates a size of a touch area corresponding to an area at the arbitrary position that is in contact with a grounding body of a user for performing the touch operation;
a control section that controls a lighting time interval of the backlight according to the calculated size of the touch area, a first criteria stored in the storage device, a second criteria stored in the storage device, and a third criteria stored in the data storage device; and
a time measuring section that measures a touch time corresponding to a duration throughout which the touch operation is continually performed at the arbitrary position of the touch panel,
wherein in accordance with the first criteria, under a condition where a size of the touch area on the touch panel is smaller than the first area value, the lighting time interval of the backlight is set as the first time,
wherein, in accordance with the second criteria, under a condition where i) a size of the touch area on the touch panel is equal to or larger than the first area value and is smaller than the second area value, and ii) the touch time measured by the time measuring section is shorter than a predetermined time value, the lighting time interval of the backlight is set as the second time, and
wherein, in accordance with the third criteria in place of the second criteria, under a condition where i) a size of the touch area on the touch panel is equal to or larger than the first area value and is smaller than the second area value, and ii) the touch time measured by the time measuring section is longer than the predetermined time value, the lighting time interval of the backlight is set as the third time.

2. The display device according to claim 1, wherein the data storage is further configured to store a fourth criteria whereby, under a condition where the touch area calculated by the area calculating section is equal to or larger than the second area value, the backlight is immediately switched off.

3. The display device according to claim 1, further comprising:
a user interface that enables a user to set any of the first area value, the second area value, the first time, the second time, and the third time.

4. The display device according to claim 3, wherein the user interface includes a program component that sets, in a stepless manner, any of the first time, the second time, and the third time.

5. The display device according to claim 1, wherein the grounding body of the user is a body part of the user.

6. The display device according to claim 1, wherein the grounding body of the user is a finger of the user.

7. A method of controlling a display device including a touch panel and a display unit with a backlight, the method comprising:
a data storing step of storing, in a data storage device, as predetermined system values, a first area value, a second area value larger than the first area value, a first time, a second time longer than the first time, and a third time longer than the second time;
an area calculating step of, when a touch operation is performed at an arbitrary position on the touch panel, calculating a size of a touch area corresponding to an area at the arbitrary position that is in contact with a grounding body of a user for performing the touch operation;
a control step of controlling a lighting time interval of the backlight according to the size of the touch area, a first criteria stored in the data storage device, a second criteria stored in the data storage device, and a third criteria stored in the data storage device; and
a time measuring step of measuring a touch time corresponding to a duration throughout which the touch operation is continually performed at the arbitrary position of the touch panel,
wherein in accordance with the first criteria, under a condition where a size of the touch area on the touch panel is smaller than the first area value, the lighting time interval of the backlight is set as the first time,
wherein, in accordance with the second criteria, under a condition where i) a size of the touch area on the touch panel is equal to or larger than the first area value and is smaller than the second area value, and ii) the touch time measured by the time measuring section is shorter than a predetermined time value, the lighting time interval of the backlight is set as the second time, and
wherein, in accordance with the third criteria in place of the second criteria, under a condition where i) a size of the touch area on the touch panel is equal to or larger than the first area value and is smaller than the second area value, and ii) when the touch time measured by the time measuring step is longer than a predetermined time, the lighting time interval of the backlight is set as the third time.

8. The display device control method according to claim 7, wherein the grounding body of the user is a finger of the user.

9. A non-transitory computer-readable storage medium having stored thereon a program that is executable by a computer of a display device including a touch panel and a display unit with a backlight to perform functions comprising:
a data storing processing for storing, in a data storage device, as predetermined system values, a first area value, a second area value larger than the first area value, a first time, a second time longer than the first time, and a third time longer than the second time;
area calculating processing for, when a touch operation is performed at an arbitrary position on the touch panel, calculating a size of a touch area corresponding to an area at the arbitrary position that is in contact with a grounding body of a user for performing the touch operation;
control processing for controlling a lighting time interval of the backlight according to the calculated size of the touch area, a first criteria stored in the data storage device, a second criteria stored in the data storage device, and a third criteria stored in the data storage device; and time measuring processing for measuring a touch time of corresponding to a duration throughout which the touch operation is continually performed at the arbitrary position of the touch panel, wherein in accordance with the first criteria, under a condition where a size of the touch area on the touch panel is smaller than the first area value, the lighting time interval of the backlight is set as the first time, wherein, in accordance with the second criteria, under a condition where i) a size of the touch area on the touch panel is equal to or larger than the first area value and is smaller than the second area value, and ii) the touch time measured by the time measuring section is shorter than a predetermined time value, the lighting time interval of the backlight is set as the second time, and wherein, in accordance with the third criteria in place of the second criteria, under a condition where i) a size of the touch area on the touch panel is equal to or larger than the first area value and is smaller than the second area value, and ii) the touch time measured by the time measuring processing is longer than the predetermined time value, the lighting time interval of the backlight is set as the third time.

* * * * *